US011522770B2

(12) United States Patent
Khetarpal et al.

(10) Patent No.: US 11,522,770 B2
(45) Date of Patent: *Dec. 6, 2022

(54) VISUAL OVERLAYS FOR NETWORK INSIGHTS

(71) Applicant: VMware, Inc., Palo Alto, CA (US)

(72) Inventors: Anar Khetarpal, Santa Clara, CA (US); Andrew Levy, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/315,705

(22) Filed: May 10, 2021

(65) Prior Publication Data

US 2021/0266231 A1   Aug. 26, 2021

Related U.S. Application Data

(63) Continuation of application No. 16/522,092, filed on Jul. 25, 2019, now Pat. No. 11,005,727.

(51) Int. Cl.
*H04L 41/22* (2022.01)
*H04L 43/06* (2022.01)
(Continued)

(52) U.S. Cl.
CPC .......... *H04L 41/22* (2013.01); *H04L 41/0246* (2013.01); *H04L 41/0654* (2013.01);
(Continued)

(58) Field of Classification Search
CPC ......... H04L 41/0253; H04L 41/14–142; H04L 41/149; H04L 41/22; H04L 43/02–067
See application file for complete search history.

(56) References Cited

U.S. PATENT DOCUMENTS 8,954,438 B1   2/2015 Mao
9,003,023 B2 *   4/2015 Crank ................. H04L 63/1416
709/224

(Continued)

OTHER PUBLICATIONS

Bartlett, Mitch , "Android: Cut, Copy, and Paste Text", May 6, 2015, Technipages.com, All pages (Year: 2015).
(Continued)

*Primary Examiner* — Brendan Y Higa
(74) *Attorney, Agent, or Firm* — Clayton, McKay & Bailey, PC

(57) ABSTRACT

Examples described herein include systems and methods for providing network insights on a graphical user interface ("GUI"). The GUI can visualize network errors to help administrative or information technology users more quickly identify issues with an enterprise application. The enterprise application can report network request information to a server. Then the GUI can present visual overlays that compare error metrics between different time cycles of the application. The visual overlay can graphically display these errors on top of one another for immediate relative visualization. Additionally, a grouped list of host destinations can be simultaneously provided. The destination addresses can be abbreviated, and errors grouped accordingly in a manner that provides advantageous error visualization.

20 Claims, 10 Drawing Sheets

(51) Int. Cl.
*H04L 43/0817* (2022.01)
*H04L 41/0246* (2022.01)
*H04L 41/142* (2022.01)
*H04L 43/0823* (2022.01)
*H04L 41/0654* (2022.01)
*H04L 43/04* (2022.01)
*H04L 43/067* (2022.01)
*H04L 43/045* (2022.01)

(52) U.S. Cl.
CPC ............ *H04L 41/142* (2013.01); *H04L 43/04* (2013.01); *H04L 43/045* (2013.01); *H04L 43/06* (2013.01); *H04L 43/067* (2013.01); *H04L 43/0817* (2013.01); *H04L 43/0823* (2013.01)

(56) References Cited

U.S. PATENT DOCUMENTS

| | | |
|---|---|---|
| 9,495,473 B2 | 11/2016 | Gardner |
| 10,530,796 B2 | 1/2020 | Patterson |
| 10,778,703 B2 | 9/2020 | Muddu |
| 11,023,511 B1 | 6/2021 | Fletcher |
| 2003/0023712 A1 | 1/2003 | Zhao |
| 2011/0119100 A1 | 5/2011 | Ruhl |
| 2011/0145715 A1* | 6/2011 | Malloy .................. H04L 43/026 715/738 |
| 2011/0225622 A1* | 9/2011 | Pearcy .................. H04L 43/045 726/1 |
| 2011/0320426 A1 | 12/2011 | Dutta |
| 2012/0017165 A1 | 1/2012 | Gardner |
| 2012/0317503 A1 | 12/2012 | Noh |
| 2014/0040180 A1 | 2/2014 | Ruhl |
| 2015/0025981 A1* | 1/2015 | Zaretsky ............. G06F 16/9566 707/740 |
| 2015/0032752 A1* | 1/2015 | Greifeneder .......... H04L 41/064 707/738 |
| 2015/0039749 A1* | 2/2015 | Kwan .................... H04L 43/067 709/224 |
| 2015/0222504 A1 | 8/2015 | Srivastava |
| 2015/0229546 A1 | 8/2015 | Somaiya |
| 2017/0061307 A1 | 3/2017 | Bates |
| 2017/0063900 A1 | 3/2017 | Muddu |
| 2019/0197077 A1 | 6/2019 | Li |
| 2020/0169484 A1 | 5/2020 | Cavuto |
| 2020/0177485 A1 | 6/2020 | Shurtleff |
| 2020/0228437 A1 | 7/2020 | Srinivasa Murthy |
| 2021/0028997 A1* | 1/2021 | Khetarpal .......... H04L 41/0654 |
| 2021/0028998 A1* | 1/2021 | Khetarpal ........... H04L 41/5096 |
| 2022/0027431 A1* | 1/2022 | Zheng .................... H04L 67/125 |
| 2022/0116291 A1* | 4/2022 | Hines .................... H04L 41/069 |

OTHER PUBLICATIONS

Krokos, Eric, et al., "Visual Analytics for Root DNS Data", 2018, IEEE.

* cited by examiner

| #HTTP ERRORS | ERROR RATE | RPM | LATENCY | NUMBER OF CALLS | DATA IN/OUT |
|---|---|---|---|---|---|
| 50 | 23% | 30 | 12ms | 100 | 20B |
| 20 | 15% | 18 | 20ms | 200 | 1B |
| 15 | 5% | 10 | 70ms | 75 | 50B |
| 10 | 8% | 35 | 50ms | 25 | 5B |

FROM FIG. 4

NETWORK LOGS
LAST 30 DAYS

▼ SEARCH HERE

SORT BY ▼
- #HTTP ERRORS
- LATENCY WALL CLOCK TIME
- ERRORS RATE
- DATE/TIME RECEIVED
- ...

| DATE/TIME RECEIVED | HTTP RESPONSE CODE | DEVICE RESPONSE CODE | AVG. DATA IN | AVG. DATA OUT | AVG. LATENCY |
|---|---|---|---|---|---|
| OCT 30, 2018, 7:06:03 PM | 200 OK | SUCCSSFUL | 20 kB | 20 kB | 12 ms |
| OCT 30, 2018, 7:06:03 PM | 200 OK | SUCCSSFUL | 20 kB | 20 kB | 12 ms |
| OCT 30, 2018, 7:06:03 PM | 200 OK | SUCCSSFUL | 20 kB | 20 kB | 12 ms |
| OCT 30, 2018, 7:06:03 PM | 400 BAD | ⊘ | 20 kB | 20 kB | 1 ms |
| OCT 30, 2018, 7:06:03 PM | 200 OK | SUCCSSFUL | 20 kB | 20 kB | 12 ms |

VISUAL OVERLAYS FOR NETWORK INSIGHTS

This application claims priority as a continuation of U.S. patent application Ser. No. 16/522,092, filed Jul. 25, 2019, titled "Visual Overlays for Network Insights," which is incorporated by reference in its entirety.

BACKGROUND

Increasingly, corporations are building their own corporate applications for specific enterprise-related purposes. These applications commonly make network requests to corporate servers and other services. However, administrative users and corporate application developers have limited insight into whether network requests and other network functionality is impacting application performance. Often, the application can perform less than optimally due to errors that occur with network requests. Network errors can delay application functionality or cause the functionality to fail. Network errors can also have application security implications. If these problems are not detected, then employee work performance or even enterprise security can suffer.

Corporate application development teams have limited tools at their disposal to identify network problems and their impact on the application. Because an application can make many different network requests to many different destinations, it can be difficult to identify which network errors are meaningful. For example, many calls to a destination can be successful so it is not immediately clear when undesirable error rates exist. The performance degradation due to network request errors may not actually crash the application, allowing the problems to remain latent. The applications themselves can also be complex, resulting in context-dependent anomalies that are difficult to identify. As a result, performing root cause analysis ("RCA") for such errors can be difficult.

More particularly, existing technologies do not easily visualize network errors to engineers in a way that allows for actionable improvements. While network request errors can be tracked or logged, a list of hundreds or thousands of such errors is not enough for a user to determine which errors are most responsible for poor performance. Additionally, it can be difficult to understand which network errors are related when the uniform resource locators ("URLs") for network destinations are long and not identical. Hundreds of unique URLs can exist for a single host or service. For example, different identifiers or subdomains in the URLs can result in unique URLs for the host or service. Listing hundreds or thousands of these URLs makes network troubleshooting unwieldy and is also uneconomical from a computing power standpoint. Finally, current interfaces also do not allow for easily comparing improvement or degradation between different cycles of application usage.

Consequently, a need exists for systems and methods that utilize visual overlays for network insights, giving development teams enough diagnostics information to resolve application problems.

SUMMARY

Examples described herein include systems and methods for visualizing network insights on a graphical user interface ("GUI"). The GUI can allow an administrative user, such as an information technology ("IT") professional, to troubleshoot issues pertaining to an enterprise application. In particular, the GUI can help visualize network-related issues that the application may be having. Identifying such issues can help ensure that the application is not causing losses in workforce productivity or risking exposing sensitive enterprise data.

In one example, the GUI can receive a selection of a host and a network request protocol (i.e., network request type). The administrative user can select all or fewer than all of the hosts that the application interacts with. These hosts can be network services, such as messaging or email services, and can be internal network services specific to the application also. The term "selection" can apply to one or more different selections.

In one example, the GUI can retrieve stored network request information that meets the selection. This can include requesting this information from a management server where the network request information is centrally stored. The management server can periodically receive and organize network request information from various client devices that execute one or more versions of the application. The network request information can be stored at the management server with other contextual information, such as an application version, operating system ("OS") version, wireless carrier, device model, time period, network protocol, and error type. This can allow the GUI to selectively receive network request information that meets the selection, effectively filtering what is received and displayed.

The GUI can display a visual overlay that compares network errors from the network requests during first and second cycles. The first and second cycles can represent different time periods. For example, the first cycle can be set to represent individual days for the past week. The second cycle can be set to 30 days prior, such that the second cycle is 30 days behind each day of the first cycle. The visual overlay can include an overlapping bar chart that visually represents the relative network error data of the first and second cycles. In this way, a single bar for a first day can show overlapping colors or shades that indicate both that day and 30 days prior. But the time unit and periods of the first and second cycles can be selected or changed by the user, allowing for flexibility in the visual overlay. Additionally, the error type, hosts, and network protocols can be selected so that the visual overlay allows the administrative user to iteratively investigate network issues for the application.

On the same screen, the GUI can also display a grouped list of network requests based on the retrieved network request information. The list can group network requests according to destination. For example, the destination can be a URL. Common destinations between different network requests can be grouped together. The URL can also be abbreviated to common path segments to make such grouping possible. This can allow the GUI to display a more concise and illuminative list rather than thousands of entries.

In one example, the abbreviated URLs can be determined based on a template. The template can specify which path segments to retain in the abbreviation, and the error information can be grouped for network requests that include these common path segments. The template can be threshold-based in one example, such that when a threshold number of network requests have common path segments, an abbreviated URL is formed. The template can also be specifically created on the GUI by the user, such as by highlighting any segments in a URL that should be the basis of an abbreviation. In still another example, a machine learning service can determine abbreviations based on which common segment groupings can reveal the most deviation in error data.

The grouped list can also, therefore, include grouped error information organized according to the abbreviated URLs. This information can be displayed on a single screen in an example. Then, based on receiving a selection of an abbreviated URL, the GUI can display multiple expanded URLs for that abbreviated URL. The expanded URLs can be displayed with corresponding error information.

In one example, multiple visual overlays can be displayed on a details screen. These can visualize network error comparisons for different error types, different application versions, different OS versions, different wireless carriers, and different device models. This can help the user quickly determine if any of those factors is playing an important role in network errors.

The method can be performed as part of a system to provide visual overlays for network insights, in an example. This can include executing, by a processor, instructions in a non-transitory, computer-readable medium to carry out the various stages.

Both the foregoing general description and the following detailed description are exemplary and explanatory only and are not restrictive of the examples, as claimed.

BRIEF DESCRIPTION OF THE DRAWINGS

FIG. 8 is an example illustration of a GUI for providing network logs corresponding to hosts or services of an abbreviated or expanded URL.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. Examples described herein include systems and methods for displaying overlays that provide network insights for application development and troubleshooting.

A GUI can be accessed by an administrative user to visualize various network issues based on data gathered during application usage. The user can select criteria, such as which hosts to examine, to narrow down the information displayed on the GUI. Hosts are also referred to as network services and can include one or more servers that are contacted over a network by the application. The selected criteria can also include a network request type, such as hypertext transport protocol ("HTTP") or HTTP secure ("HTTPS"). The GUI can then retrieve stored network request information meeting the selected criteria. This information can include prior requests collected from the application running on numerous client devices.

The GUI can then display a grouped list of network requests based on the retrieved network request information. The grouping can allow the user to make actionable observations about network requests to particular hosts. In one example, the network requests are grouped by abbreviated URLs. An abbreviated URL can be a collapsed version of otherwise unique URLs, collapsing from right to left (i.e., from the end towards the start of the URL). This can allow the GUI to display compiled error information for each abbreviated URL, such as the number of errors, error rate (e.g., percentage), latency, data in, data out, number of requests. If the user would like more granular insight, they can expand the abbreviated URL to reveal the grouped unique URLs that belong to it. This can also include displaying associated network logs.

On the same GUI screen, the GUI can display a visual overlay that compares network errors from the network requests during first and second cycles. The first cycle can be, for example, the last few days. The second cycle can be some other past time period, such as the day before or thirty days before. The visual overlay can appear as an overlapping bar chart that visually represents the relative network error data of the first and second cycles. The user can therefore see if particular network request types for particular hosts are causing more or fewer HTTP errors, which can be helpful in spotting either positive or negative trends.

Figure 1:
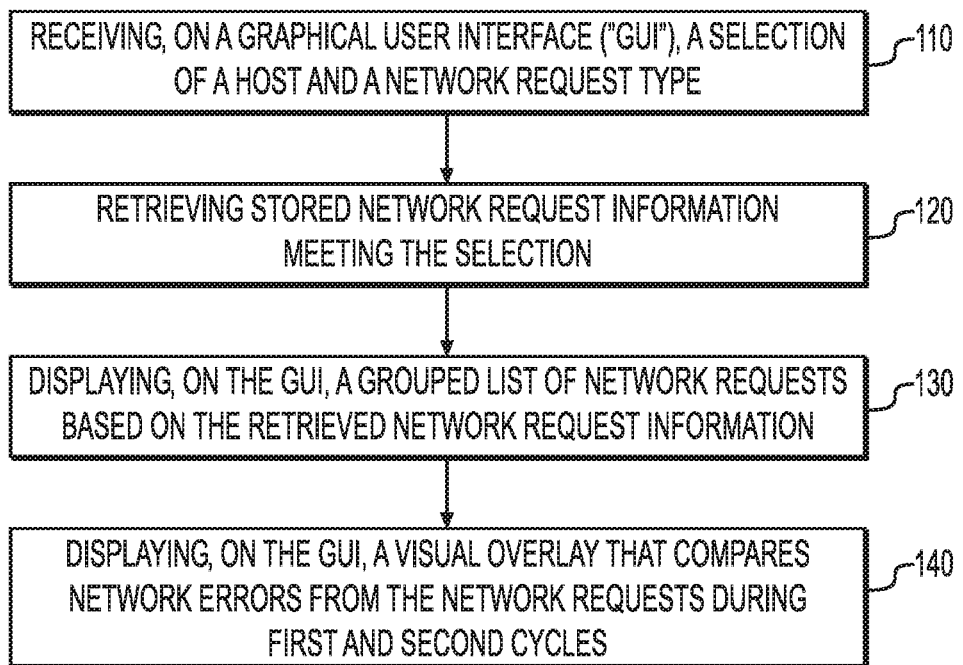
FIG. 1 is a flowchart for an example method for providing overlays for network insights.

FIG. 1 includes example steps for graphically providing network insights that are helpful for application development. At stage 110, the GUI can receive a selection of a host and a network request type. The selection can include multiple selections. For example, a drop-down list or menu of possible hosts can be presented, and the administrative user can select one or more of those hosts for examination. A separate drop-down list or other GUI element can allow the user to focus on certain network request types, such as HTTP or HTTPS requests.

The GUI can also provide other selections that are considered part of a selection of filtering criteria. For example, the GUI can allow the user to select particular application versions, OS versions, wireless carriers, device models, time periods for examination, and error types. As will be described, these selections can filter what the GUI displays in a list of abbreviated URLs and in one or more visual overlays.

At stage 120, based on the user selection of stage 110, the GUI can retrieve stored network request information. In one example, the network request information is stored at a server that is accessed by the GUI, such as a management server. The management server can periodically collect network request information from user devices that run the application, in an example. For example, the application can implement a software development kit ("SDK") that causes network requests to be captured and eventually reported to the management server or some other repository location. The network request information can be captured as part of user flows for the purpose of providing insight into the application usage and performance. The format or exact types of information collected can vary between examples. In one example, the management server can collect codes that are part of network requests and responses, latency information, error information, date and time, and identifying information about the application or the user device. For example, the network request information can identify an application version, OS version, wireless carrier, and device model. These variables can all potentially impact network operation with the application.

At stage 130, the GUI can display a grouped list of network requests. This can include grouping network requests for analysis by destination. In one example, the destination is represented by an abbreviated URL, with the abbreviation retaining some left-most portion of the URL while omitting the right-most portion. The network requests that share the remaining abbreviated portion can be grouped together for display in the grouped list. In one example, the administrative user can select which hosts (i.e., network services) to include in the grouped list in stage 110.

The grouped list can also include grouped error information, such as the number of errors, average number of errors, or percentage of errors. The abbreviated list can be ranked according to this error information. Doing so can automatically surface common network errors that are impacting application performance. Other averages, such as average latency, can also be included. Still more grouped analytics, such as standard deviations, can be included or displayed upon selection or mouse-over. The GUI can also provide other contextual information grouped for each abbreviated URL, such as average latency, request volume, number of requests.

On the same screen, at stage 140, the GUI can also display a visual overlay section that compares the network errors of the retrieved network request information over different cycles. For example, the errors of today can be compared against the errors of a month ago. The GUI can provide a selection element for picking the past cycle in an example, allowing for selecting a time period to which the comparison should be made.

The comparison itself can be achieved visually using the visual overlay. The visual overlay can be represented as a chart where the compiled results of the two cycles are superimposed on one another. For example, the visual overlay can include a bar chart where bars for both cycles are superimposed on top of one another. The first cycle can be represented as multiple bars for respective multiple days. The second cycle can be represented as superimposed (i.e., overlaid) bars relative to those days. The second cycle can be, for example, a day, a week, or a month behind each day of the first cycle, depending on user selection. In another example, the visual overlay superimposes line charts. The visual overlay can allow the user to easily see if errors are increasing or decreasing. Because the user can select the hosts, request types, and error types, the visual overlay can allow the user to quickly spot an increasing or decreasing network issue.

When the user sees an issue of interest, such as an increase in error rate, this can also provide context regarding the grouped list. The user can then select an abbreviated URL, causing the GUI to present an expanded URL list or even a related network log, depending on an example. This can allow the user to zoom in on an issue from a macro level to the micro level while using the GUI.

Likewise, the GUI can allow the user to sort the errors from the request information according to error type, application version, OS version, cell carrier, and device model. Each of these can result in a different visual overlay. In one example, all five visual overlays are displayed together. This can allow the user to quickly spot anomalies when a certain color bar exceeds the other superimposed bars. By providing this information on a single screen in one example, the GUI can allow the user to quickly determine if the network error is specific to one or more of the application version, OS version, carrier, or device model.

Figure 2:
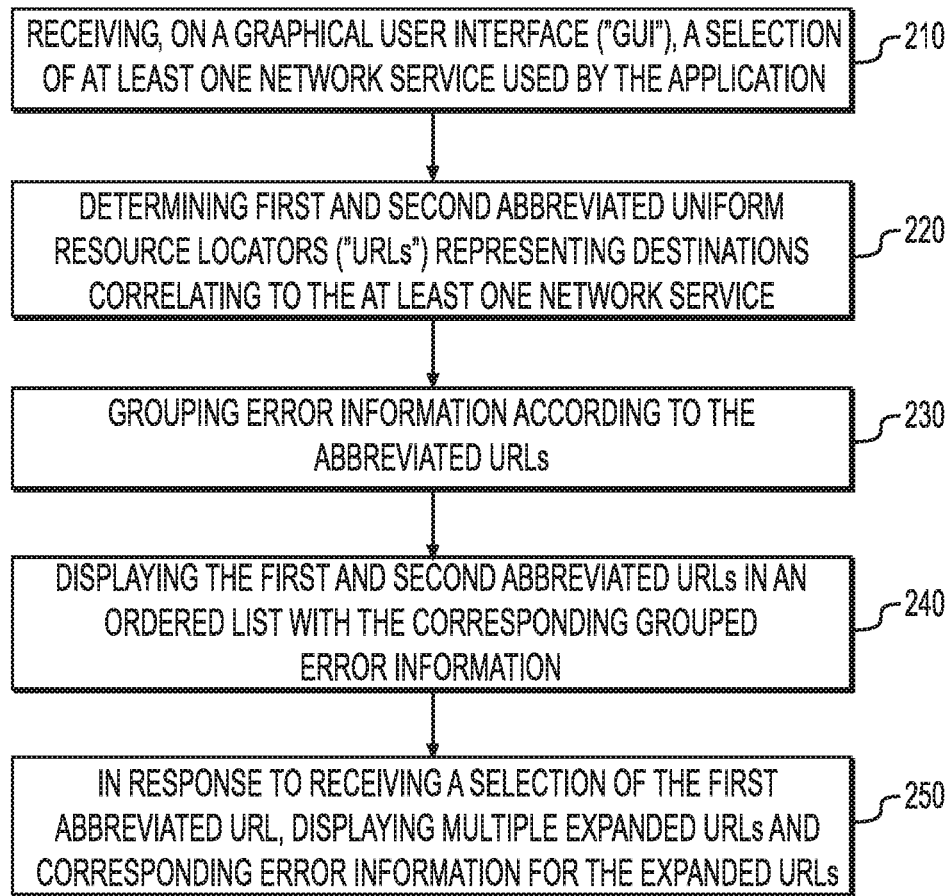
FIG. 2 is a flowchart for an example method for providing abbreviated URLs for network insights.

FIG. 2 is another method of example stages related to the grouped list with abbreviated URLs. At stage 210, the GUI can receive a selection of a network service used by the application. The possible network services can be automatically determined based on the destinations present in the network request information, in an example. Alternatively, they can be typed into the GUI or a backend system (such as the management server) that the GUI accesses. The selection of stage 210 can include one or multiple selections, including those already described with regard to stage 110 of FIG. 1.

At stage 220, the GUI can determine abbreviated URLs in order to represent destinations correlated to the selected network service(s). This can include retrieving the corresponding network request information and determining how to abbreviate the URLs. In one example, when a threshold number of unique URLs share a base number of path segments, the GUI can create an abbreviated URL based on those shared path segments. For example, unique URLs can be grouped according to common path segments as shown in the example of Table 1, below:

TABLE 1

| URL type | URL |
| --- | --- |
| Unique | developers/crash-details/1968034309254 61a8f57cbc07f5c857d00555300 |
| Unique | developers/crash-details/1968034309254 61a8f57cbc07f5c857d00555301 |
| Grouped/ abbreviated | developers/crash-details/** |

In the example of Table 1, the abbreviated URL can be indicated by the double asterisks (**). However, both of the unique URLs can be represented together as the abbreviated URLs. Even if two or more unique URLs are actually the same, they can be reduced down and included in the abbreviated URL based on the number of URLs sharing the "developers/crash-details/" path segments. In one example, when a threshold number, such as 100, of URLs sharing path segments is exceeded, those path segments can form the basis of an abbreviated URL.

Similar rules can apply to nested abbreviations. For example, if the segment "crash-details" from Table 1 appears 100 times, the abbreviated URL can become "developers//". Then, if the user clicks this doubly abbreviated URL, the nested abbreviated URLs beginning with "developers/crash-details/**" can display. Clicking one of those can reveal the unique URLs of Table 1.

In one example, the abbreviated URLs are created based on truncated network request information that does not include the full URLs from the network requests. For example, the management server, the application itself, or some other server can strip parts of the URL out before storing the relevant parts. In one example, the SDK implemented by the application can be set by the management server to govern which portions of the URL are stored. For example, hosts and paths can be stored, but ports and queries can be ignored. Sensitive information, such as usernames and passwords, can similarly be stripped out of the URLs to avoid security or identity concerns. Because hundreds of thousands or even millions of network requests can be stored, culling information in this way can significantly save storage space.

URLs can be dissected and stored based on rules at the management server, which can be implemented at the application based on an SDK. Doing so can prevent sensitive information from being stored as part of the network request information by culling out those portions before the application transmits the remaining network request information to the management server or other repository. This will be discussed later with regard to stage 305 of FIG. 3.

Continuing with stage 220 of FIG. 2, in one example the GUI can also provide an interface for creating abbreviation templates. The templates can specify how far to collapse a URL when abbreviating it. The template, in one example, can also allow the user to specify nested abbreviated URLs. This can allow abbreviated URLs to be abbreviated even further when enough of them exist. Then, if the user were to expand the abbreviated URL, the nested URLs can display. Those nested URLs can then be expanded even further.

At stage 230, once the abbreviated URLs are determined, the GUI can group error information according to the abbreviated URLs. This can include compiling the error information for the URLs that fall under the abbreviated URL. For example, a number of errors can be summed for the abbreviated URL or an error rate can be determined based on the percentage of total network requests for the abbreviated URL that result in an error. The type of error can also be considered, based on the user's GUI selections. Error codes in the network request information can correspond to different error types, in an example. Other information can similarly be compiled, such as an average latency, an average request volume, number of requests, average data in, and average data out.

At stage 240, the GUI can display first and second abbreviated URLs in an ordered list with corresponding grouped error information. The ordering can be based on the number of errors, highest first. Alternatively, it can be based on the error percentage or some other feature, such as highest latency. The user can select how to order the list in an example, such as by clicking on the column that should be given order preference.

At stage 250, the GUI can receive a selection of an abbreviated URL in the list. In response, the GUI can display multiple expanded URLs that were subsumed by the abbreviation. The GUI can also display corresponding error information for those expanded URLs. This can help a user easily drill down into more detail when they have identified the high-level error trend they are interested in. In one example, clicking the abbreviated URL or a nearby button or icon can also allow the user to review the corresponding network log of communications with the host at that path.

Figure 3:
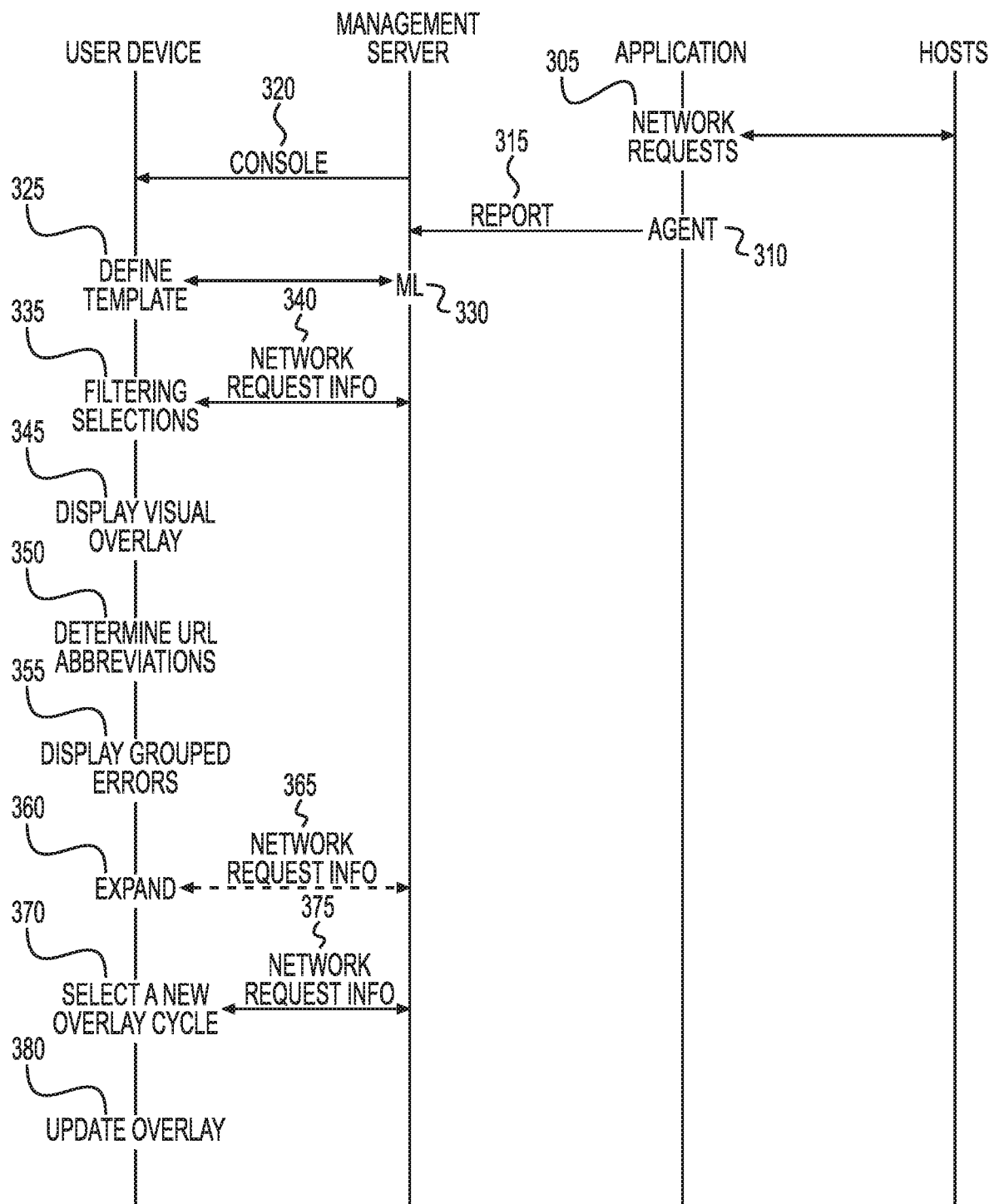
FIG. 3 is an example sequence diagram with stages for providing overlays for network insights.

FIG. 3 is an example sequence diagram for providing an enhanced GUI for network insights. At stage 305, various user devices (not shown) can execute the application. The application can make network requests to any number of hosts. The reasons for these network requests can be myriad. For example, the application may need to retrieve data, validate an identity, access a repository, or even execute a portion of code that is remotely located.

As these network requests are made, the application can track aspects of the network requests and store those as network request information. However, in one example, the application stores only some portions of the network requests made at stage 305. Those portions can be determined based on an SDK implemented by the application or based on an agent that executes at the client device (i.e., a user device running the application) or within the application itself at stage 310. In either case, the management server can provide rules that govern which portions of the network requests are stored. Those rules can be built into the application in an example. The application can, for example, eliminate sensitive information, culling out those portions before the application transmits the remaining network request information to the management server or other repository.

In more detail, URLs can be analyzed by the application or agent according to the following format:
scheme:[//[user[:password]@]host[:port]][/path][?query][#fragment]

Take, for example, the following URL:
http://kevan:orf@www.google.com:80/a/b?c=d#section3

The first portion, "http," represents the scheme (i.e., request type) and is stored as part of the network request information, in an example. But the application may not store other types of schemes, such as SMB or FTB, depending on the rules set at the management server.

The scheme can consist of a sequence of characters beginning with a letter and followed by any combination of letters, digits, plus (+), period (.), or hyphen (-). Although schemes can be case-insensitive, the canonical form is lowercase and documents that specify schemes can do so with lowercase letters, in an example. The end of the scheme can be indicated by a colon or multiple slashes, depending on the scheme. Examples of popular schemes include http (s), ftp, mailto, file, data, and irc.

Continuing with the example URL above, "kevan:orf" is potentially sensitive user or password information that can be stripped out and not stored as part of the network request information. In general, authentication information can be stripped out prior to sending the information to a repository for storage.

The host is represented by "www.google.com," and can be stored as part of the network request information. This can correspond to one of the hosts that the user can select on the GUI for analysis. In addition, a domain can be derived from the host and stored. For example, www.google.com and api.google.com both have a domain of google.com. Similarly, countries with two-part suffixes, such as google.co.uk, can have a domain of google.co.uk. The extraction of the domain can help handle content delivery networks ("CDNs") that commonly have many subdomain hosts.

The port "80" is stored in some examples but omitted in others. The port can be useful for diagnosing problems, for example, when a non-standard port number is used. But ports 80 and 443 are implicit in the HTTP or HTTPS protocols.

The path "a/b" can be stored in an example. Each of "a" and "b" can represent different path segments. The path segments can be used to determine abbreviations as described in stages 130, 220, or 240 of FIGS. 1 and 2.

Different examples can either store or omit the query "?c=d." Omitting the query can save storage space. Likewise, the fragment "section3" can be stripped from the URL by the application prior to sending the information to the management server. Removing extraneous information can make the reporting process less invasive at the user device that is executing the application by saving storage space and bandwidth at the user device.

Storing the network request information in this way can reduce storage space, guard sensitive information, and require less network bandwidth when the application reports to the management server.

At stage 315, the application can report the stored network request information to the management server. These can be reported periodically and in bulk, in an example, to reduce the number of contacts that the application makes with the management server. The management server can request a subset of the stored network request information in an example. The management server can alternatively be a repository that the application periodically uploads the culled network request information to.

In one example, the management server provides a console to administrative users at stage 320. The console can include a GUI for network insights regarding the application. An administrative user can access the console using a user device, such as a phone, tablet, laptop, or computer. The GUI can be web-based in an example, providing remote access. Alternatively, it can be part of a local program on the user device. The console can provide options regarding which network request information to collect from the application, in one example. This can impact which information gets reported at stage 315.

At stage 325, the GUI can provide options for defining custom URL templates. In one example, the user can select a URL that displays in the list on the GUI screen. The user can highlight one or more path segments and set those to be the abbreviation. In one example, selecting one or more segments and then right clicking can bring up an option to set the abbreviation template. Then the grouped list can be reorganized based on the custom abbreviation. The custom abbreviation can be stored as a reusable template. This can allow the user to control how much the URLs will collapse from right to left when being abbreviated, in an example.

In another example, at stage 330 a machine learning process can be implemented to determine adjustments to the template defined at stage 325. In one example, the machine learning algorithm operates at the management server, but it can also operate elsewhere. The machine learning algorithm can determine optimal abbreviations for different sets of network request information. For example, certain hosts can have different optimal abbreviations based on the URLs generated for those hosts. The optimal abbreviations can be those that reveal greater deviations in compiled error metrics between the different abbreviated URLs. This can allow the user to more easily locate the network requests and destinations most responsible for errors.

To view the network insights for the application, the user can navigate to a network insights screen on the GUI, in an example. This can be configured to provide insights regarding network errors experienced by the application. At stage 335, the user can make filtering selections to control which information gets displayed. These selections can include choosing one or more of hosts to include, error types, app versions, OS versions, carriers, and device models. This can narrow down what network request information is used to visualize the results on the GUI. In one example, at stage 340, the GUI can request a subset of network request information from the management server. The management server, in one example, can send over the requested information, which can include unique URLs for the GUI to potentially abbreviate. In another example, the management server sends abbreviated URLs with compiled error information based on the filtering selections.

Based on the filtering selections of stage 335, the GUI can simultaneously display a visual overlay and a list of abbreviated URLs with grouped error information at stages 345, 350, and 355. The visual overlay displayed at stage 345 can include one or more charts that visually compare a current first cycle against a historical second cycle. The GUI can provide options for selecting the desired historical second cycle for comparison. The comparison itself can be visually represented by superimposing the error graph for both cycles on top of one another. This can reveal significant changes in errors between cycles, letting the user gauge, for example, how a recent update impacted network errors.

The grouped error information can also be separately displayed on the same screen as part of a list of URLs at stage 355. To display the list, the GUI can determine the URL abbreviations at stage 350. This can be based on custom URL templates, such as a template defined at stage 325 or constructed through machine learning at stage 330. The GUI can also determine the abbreviations at stage 350 based on the number of URLs having the same host and common path segments. For example, if more than 100 URLs from the same host have three consecutive path segments in common (from left to right), then the three path segments can be automatically selected as the abbreviation. Other threshold numbers, aside from 100, can be used to trigger this automatic selection. A visual indicator of the abbreviation, such as double asterisks, can be added to the abbreviated URL so that the user will understand the grouping and know they can expand the collapsed and abbreviated URL if desired.

The errors can be grouped based on the abbreviated URLs and displayed contemporaneously at stage 355. This can include displaying a total number of errors, average number of errors, error rate, and other information.

At stage 360, the user can select an option to expand an abbreviated URL. This can include simply clicking on an abbreviated URL in one example. In another example, a button is present to see more details. In one example, expanding the URL can cause the user device to retrieve the underlying network request information. This can already exist locally on the user device, in an example. Alternatively, the GUI can send a request to the management server for the underlying information at stage 365. This can cause the management server to return the corresponding network request information.

At stage 370, the user can select a new time period to apply to the comparison in the visual overlay. This can include selecting a time length into the past that should be compared against the current cycle. For example, the user might want to compare yesterday, the prior week, the prior month, or even the prior year. Doing so can necessitate retrieving new network request information for the chosen time range. This can include retrieving additional network request information from the management server at stage 375.

Using the new information, the GUI can update the visual overlay at stage 380. By visualizing different time periods for the comparison cycle, the user can get a sense of how network errors have originated and evolved.

Figure 4:
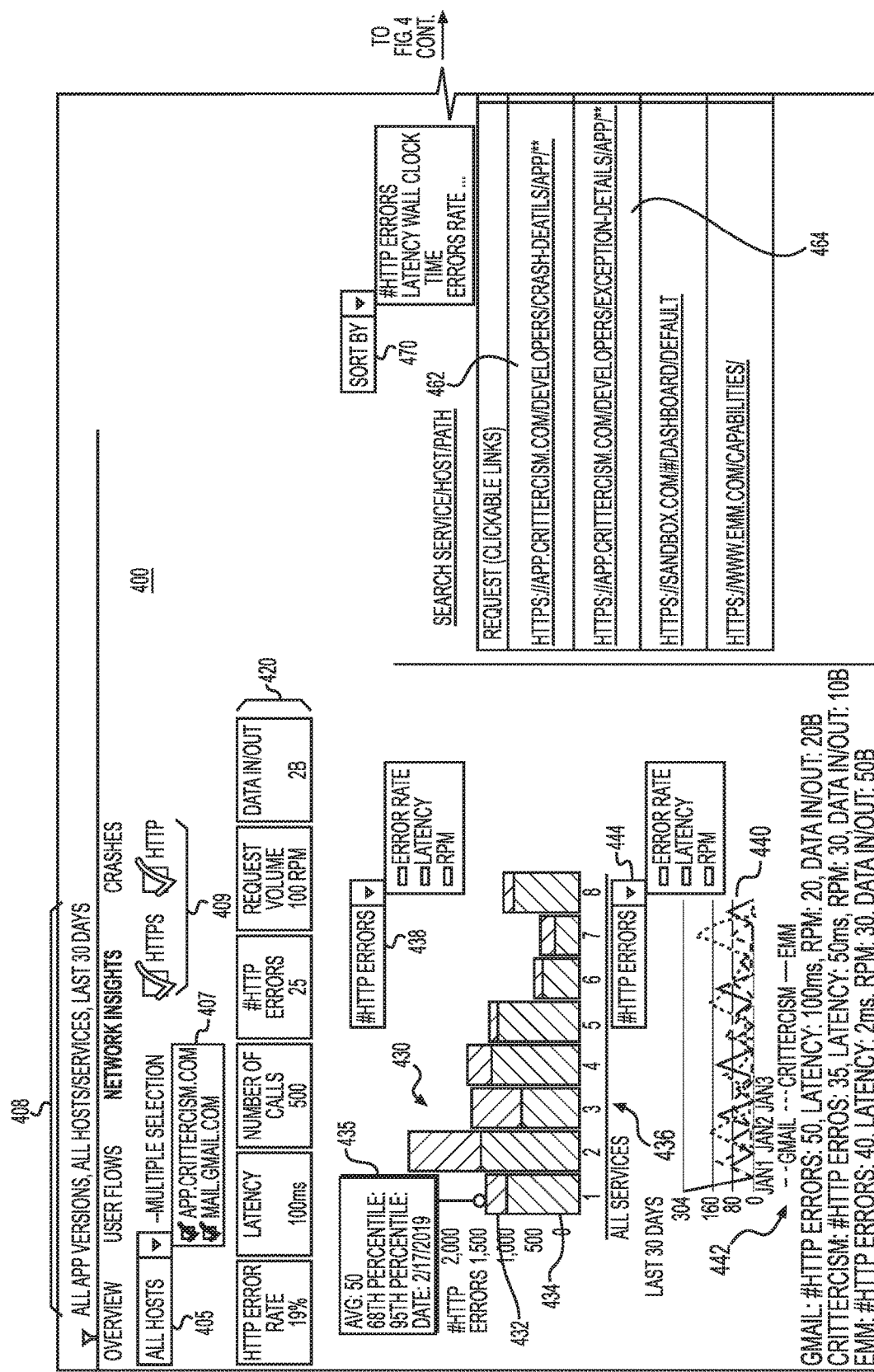
FIG. 4 is an example illustration of a GUI for providing overlays for network insights.

FIG. 4 is an example illustration of a GUI for providing network insights. In this example, the screen 400 is displayed based on a network insights selection, but other selections such as overview, user flows, and crashes can provide different details. For network insights, the GUI can present a visual overlay 430 and a grouped list 460 (spanning FIGS. 4 and 4 Cont.) on the same screen 400. Both can be based on network request information that is filtered according to a selection by the user, which can include multiple selections on the GUI screen 400. In this example, global filters 408 include all application versions, all hosts (i.e., services), and data from the last 30 days. Additional filters can include device model, OS type, application version, and carrier. The device model can allow the user to visualize errors for the application when it runs on only particular types of devices. The same is the case for OS type, application version, and carrier. These filtering criteria can be combined in any combination, in an example.

Global secondary filters can allow the user to further tailor the visualization. Example secondary filters can include request type, error rate, error type, number of errors, request volume, data in, and data out. Similarly, the user can narrow down error visualization based on particular error metrics, such as the error rate, type, or number of errors. This can help eliminate noise that the user is not interested in examining. The user can also set data in and data out thresholds to examine network requests of varying size. It is possible that the sort of problems for large requests can differ from those of small requests.

In this example, selection 405 allows the user to pick which hosts and services to include in the visualization. In this example, app.critercism.com and mail.gmail.com are two of the selected hosts 407. The GUI also includes selection options 409 for request type. In this example, HTTPS and HTTP are selected, but other request types are also possible.

Turning to the visual overlay 430, multiple bars are presented. These bars can represent errors for one or more of the selected request types (using selection options 409). The user can individually or collectively review different error metrics in the visual overlay using an error selection option 438. In this example, the number of HTTP errors are shown. However, other selection options include error rate, latency, and RPM. The error rate can represent a ratio of errors to the successful requests. Latency can be an average of request durations. This can be determined by dividing the total request time by the number of total requests for that host (e.g., service, domain, or endpoint). The application SDK can send an active time and elapsed time in one example, and these can be used to determine latency. RPM can represent request volume, which can indicate how many requests occur over a time period, such as a minute, past hour, or past 24 hours, depending on a time filter selected by the user. RPM can be an average request volume over that time period.

In this example, bars corresponding to days 1-8 are shown. These days can be indicated by specific dates, in an example. The eight days can represent a first cycle. In this way, the cycle can be set based on a time unit (e.g., day) and number of time units (eight). But other time intervals, such as hours, can be selected for the first cycle in an example. Likewise, different numbers of time units can be selected.

Each day in this example has its own bar indicating a number of errors. Each bar is also overlaid with information from a second cycle. For example, the bar for the first day (day 1) shows both the first cycle data 434 and the second cycle data 424. The second cycle can be a week prior, and the visual overlay 430 can show that the number of errors has decreased since then.

In one example, hovering over or selecting a bar can reveal additional details. For example, hovering over the second cycle portion 432 of the first bar can cause a box 435 to appear. The box 435 can reveal the average number of errors for that second cycle, and the number of errors that meet first and second standard deviations. If the user changes the error type being displayed, for example, to latency, then the box 435 can instead report latency. In this example, the first standard deviation is $68^{th}$ percentile and the second standard deviation is $95^{th}$ percentile. The date of the second cycle can also be shown.

Various metric totals from the visual overlay 430 can be presented in cards 420 above the visual overlay 430. In this example, the cards 420 can display a total error rate (19%), latency (100 milliseconds ("ms")), number of calls (500), number of errors (25), request volume (100 RPM), and data in and out (2B). These can be averages for each day in an example. The cards can change according to the global filters selected.

A separate graph 440 can show how each service contributes to the total number of errors or other error metric. The same error selection options 444 as presented in selection 438 can be available. Text 442 can also summarize the errors, latency, RPM, and data in and out for each of the selected hosts individually, in an example.

The grouped list 460 (spanning FIG. 4 and FIG. 4 Cont.) can be presented on the same screen 400 as the visual overlay 430. The grouped list 460 include destination paths that include abbreviated URLs, such as first abbreviated URL 462 and second abbreviated URL 464. The double asterisks (**) can indicate where the abbreviation begins in the URL path. As shown in FIG. 4 Cont., error information is summarized for each URL, including the first and second abbreviated URLs 462, 464. The error information can include the number of errors, error rate, RPM, latency, number for requests (i.e., calls), and data in and out. The latency can also be a total latency for an application, which can be determined based on average latency multiplied by that application's number of calls. This can reveal the kind of lag being experienced by users of the application. The data in and out can be combined in a single column or broken out into different columns. By default, the grouped list 460 can be ordered based on number of errors. But the user can also sort the grouped list 460 can also be sorted based on any of the other columns. A sort option 470 can allow the user to change the default sort order in an example.

In one example, a user can select one of the URLs, such as the first abbreviated URL 462. The user can then be provided with a details page, such as screen 500 in FIG. 5. The details page can include the global filters 505 and secondary global filters 506. The user can edit these by selecting edit buttons and changing, removing, or adding different filters. Global filters 505 can include application versions, hosts (i.e., services), and data time period (e.g., the last 30 days). Additional global filters 505 can include device model, OS type, application version, and carrier. The device model can allow the user to visualize errors for the application when it runs on only particular types of devices. The same is the case for OS type, application version, and carrier. These filtering criteria can be combined in any combination, in an example. Secondary global filters 506 can allow the user to further tailor the visualization. Example secondary filters can include request type, error rate, error type, number of errors, request volume, data in, and data out. Similarly, the user can narrow down error visualization based on particular error metrics, such as the error rate, type, or number of errors. This can help eliminate noise that the user is not interested in examining. The user can also set data in and data out thresholds to examine network requests of varying size. It is possible that the sort of problems for large requests can differ from those of small requests.

Summary error information 510 similar to that of the cards 420 of FIG. 4 can display. But below that, detailed information about the errors for the selected destination (e.g., the first abbreviated URL 462) can be shown. In this example, multiple visual overlays 520, 530, 540, 550, and 560 are presented on the same screen 500. The first visual overlay 520 can compare different error types 522. These error types can be divided based on different protocols (e.g., HTTP and HTTPS). They can also be based on different error codes contained in the response to the network request. They can be overlaid in bar chart fashion, allowing the user to easily see which error types are most prevalent. This can allow the user to more easily address the error.

The additional simultaneously shown visual overlays provide synergistic insight. For example, a second visual overlay 532 can compare errors among different application versions. A third visual overlay 540 can compare errors among different OS versions. A fourth visual overlay 550 can compare errors according to different wireless carriers of the user devices that ran the application. A fifth visual overlay 560 can compare errors among different device models. Viewing all of these visual overlays 520, 530, 540, 550, and 560 on a single screen can allow the user to very quickly determine if any of these characteristics (application version, OS version, carrier, and device model) are the main source of a particular error type. This can be very advantageous for an administrative user performing a root cause analysis ("RCA").

For even more granular detail, the user can select a log button 512, which can generate a network log having specific entries for the selected destination (first abbreviated URL 462). An example log is discussed later with regard to FIG. 8.

Figure 6:
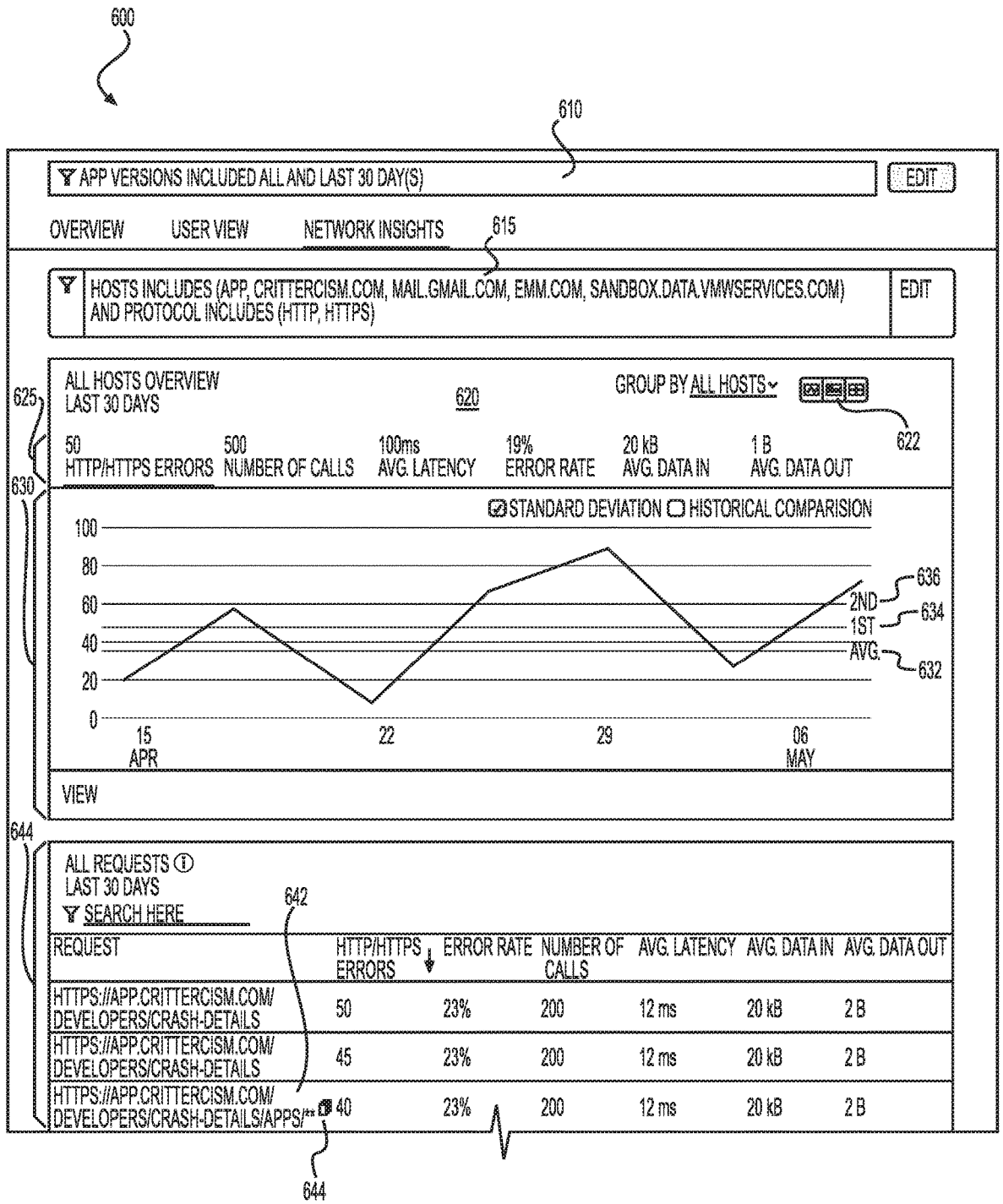
FIG. 6 is an example illustration of a GUI for providing standard deviations for network errors.

FIG. 6 provides an illustration of a different example detail screen 600 that shows errors plotted in a standard deviation chart 630. The chart 630 can plot the errors against first and second standard deviations 634, 636, with an average 632 for reference. The standard deviations can reveal abnormal error spikes that should draw the user's attention.

A pane 620 containing the standard deviation chart can also include error summaries 625. As with prior screens, global filters 610 and secondary filters 615 can be displayed. Changing these filters can change the error summaries 625 and also the data plotted in the standard deviation chart 630.

Detail screen 600 can also have a grouped list 640 that allows the user to focus on or expand grouped requests. For example, abbreviated URL 642 can be clicked and expanded, revealing the various requests that were collapsed into the abbreviated URL. In one example, an icon 644 indicates that the abbreviated URL 642 represents multiple requests. Clicking the icon 644 can expand the list 640 to show the collapsed requests. It can alternatively cause the GUI to show a network log, such as illustrated in FIG. 8.

Figure 5:
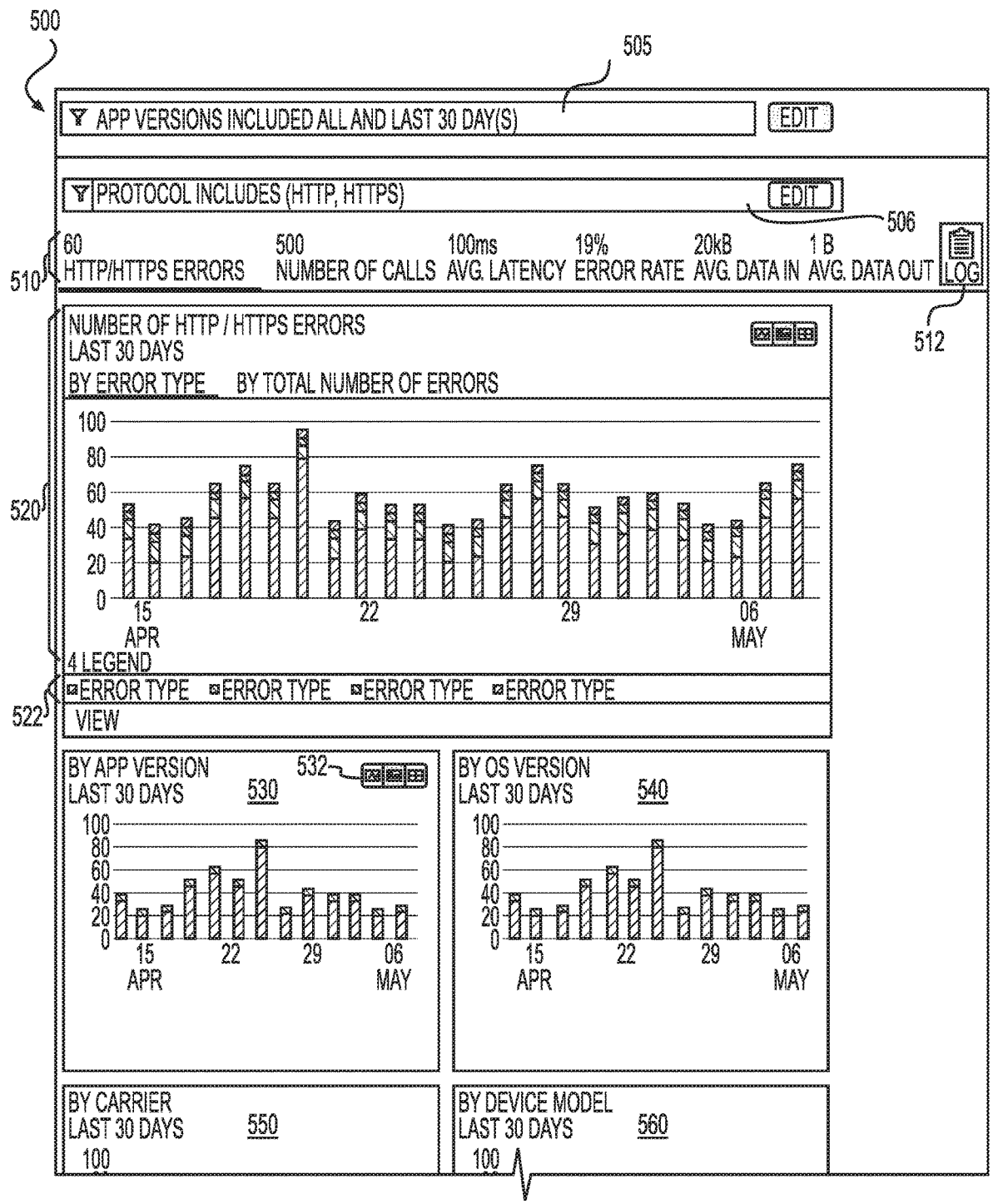
FIG. 5 is an example illustration of a GUI for providing overlays for network insights.
Figure 7:
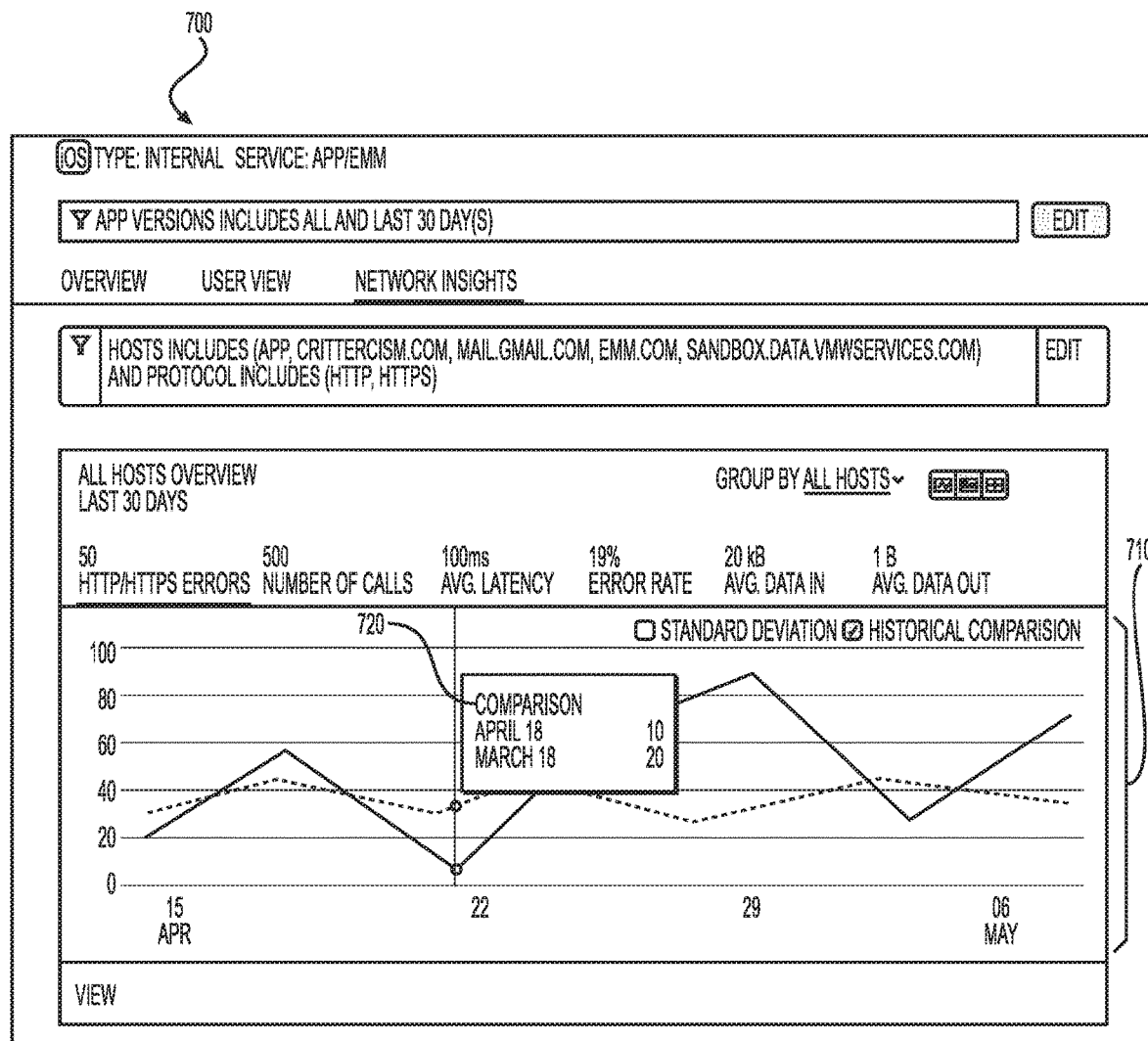
FIG. 7 is an example illustration of a GUI for providing historical comparisons for network errors.

Additionally, the detail screen 600 can include a toggle 622 that allows the user to toggle between detail views, such as screen 500 of FIG. 5 and screen 600. Another such detail view that the user can access can include a historical comparison screen 700 of FIG. 7. This screen 700 can include a bar or line graph 710 that compares errors on different dates. The same filtering as already described can be used to tailor the historical comparison. Hovering over or clicking various points in the graph 710 can cause a box 720 to identify specific error values at the compared dates.

FIG. 8 is an example illustration of a network log 800. This can be accessed as a low-level research tool based on selection of a destination, such as abbreviated URL 464, 642 from a prior screen 400, 600. The network log 800 can include information about the network requests, including date and time received 810 and response codes 820, 830. An HTTP response code 820 can be an HTTP status code received from a host server. A device response code 830 can be generated at the user device that executes the application. The device response code 830 can indicate whether the device determined the request was a success or not. Other information about each request, such as average data in 840, average data out 850, and average latency 860 can also be presented.

The network log can be specific to a single host, in one example. The network log 800 can be retrieved from the management server or from the host itself. For example, the user device can provide credentials to the host that allow the application to retrieve and display the network log 800.

In this example, network request 870 includes a response code 820 that indicates the response was bad. The device response code 830 also indicates a failure. These failures can be aggregated for the error analysis presentation of FIGS. 4 and 5. However, by viewing the network log, the user can look at specific failures to see, for example, if they are grouped together during a single time period or if they are dispersed throughout the entire period being analyzed. Other anomalies, such as the data in, data out, or latency, can also be identified.

In one example, the network log 800 can be sorted using sort options 870. For example, the network logs can be sorted by errors, by latency, by periods with higher error rates, and by the date time of the log entry. Using these sort options can cause error entries of interest to the user to rise to the top of the network log 800. In one example, the network log 800 can also show the number of errors and error rate for each request.

Figure 9:
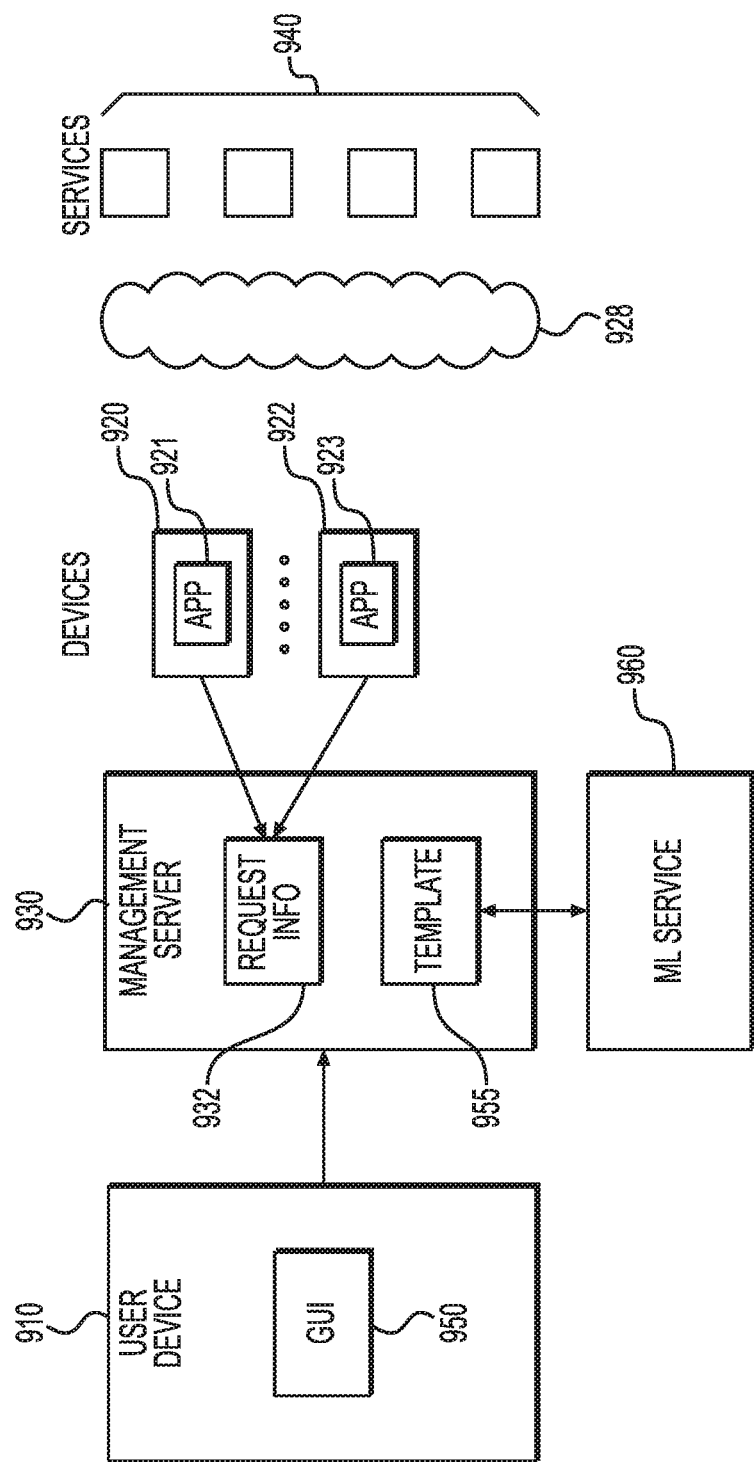
FIG. 9 is an illustration of example system components for providing visual overlays for network insights.

FIG. 9 is an illustration of example system components used for visualizing network insights on a GUI. In one example, many client devices 920, 922 can execute an application 921, 923. These applications 921, 923 can be the same or different versions. Additionally, the client devices 920, 922 can be various device models and run different OS versions, in an example. The client devices 920, 922 can be any processor-enabled device, such as a tablet, phone, laptop, or personal computer. The applications 921, 923 can make various network calls over a network 928, such as the internet or an intranet. These network calls can be to any number of different network services 940, also referred to as hosts. Network services 940 can each include one or more servers that receive the network requests and respond to the client devices 920, 922. The network services 940 can be third party services for messaging or emailing. The network services 940 can also be in-house enterprise services for handling specific application functionality.

The applications 921, 923 can implement an SDK in one example. The SDK can specify what data the applications 921, 923 collect. This can include user flow data and can also include network request information. As has been described, the client devices 920, 922 can store the network request information for batch upload to a management server 930. In one example, sensitive or irrelevant information is stripped out of the network request information before storing it locally or sending it to the management server 930. For example, usernames and passwords can be removed. The applications 921, 923 or agents on the user device can be responsible for storing the network request information. The SDK can, for example, include methods for storing the right subset of information each time a network request is made.

Periodically, the applications 921, 923 can report the network request information to the management server 930. The management server 930 can include one or more servers, each having one or more processors. The management server 930 can organize and store the network request information 932 according to attributes such as application version, device type, OS type, and request protocol. This network request information 932 can then be accessed by an administrative user device 910 that executes the GUI 950. The GUI 950 can be part of an analytics suite and can display network insights, such as those described above. The administrative user device 910 can be any processor-enabled device, such as a laptop, tablet, phone, or personal computer. The administrative user device 910 can display the GUI 950 by running a local analytics application or a web-based analytics application. The analytics application can provide appropriate credentialing to the management server 930 to access the relevant network request information 932.

In one example, the management server 930 or administrative user device 910 can store and use templates 955 for determining how the GUI 950 will abbreviate URLs for network request destinations. These templates 955 can be created by an administrative user through use of the GUI 950, in an example. Alternatively, they can be created using a machine learning service 960. The machine learning service 960 can apply machine learning algorithms to the network request information 932 to determine common path segments for various filtering conditions and for different network services 940. In one example, the machine learning algorithms can favor groupings that concentrate error information such that it exceeds a standard deviation. This can result in templates 955 that more optimally group URLs in a manner that reveals abnormalities. The machine learning service 960 can execute on the management server 930 or on some other server that has access to the management server 930.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing network insights relative to an application, comprising:
    receiving, on a graphical user interface ("GUI"), a selection of multiple hosts that receive network requests;
    for the selected hosts, retrieving stored network requests and grouping the network requests according to abbreviated uniform resource locators ("URLs") of the network requests;
    displaying, on the GUI, network errors corresponding to the abbreviated URLs; and
    displaying, on the GUI, a visual overlay that compares network errors for the selected hosts, wherein the comparison includes overlapping chart information visually representing the relative network errors of first and second cycles, and wherein the second cycle is a past time period compared to the first cycle.

2. The method of claim 1, wherein the first cycle is represented as multiple bars for respective multiple days and the second cycle is represented as overlays, wherein a past date value is selected on the GUI for the past time period of the second cycle.

3. The method of claim 1, wherein the network errors corresponding to abbreviated URLs is displayed contemporaneously on the GUI with the visual overlay.

4. The method of claim 1, wherein the GUI further displays, for the abbreviated URLs, a number of errors, an error rate, a latency, and a number of network requests to the respective abbreviated URL.

5. The method of claim 1, further comprising:
    receiving a selection of a first abbreviated URL on the GUI; and
    displaying, on the GUI, a network log for the first abbreviated URL.

6. The method of claim 1, wherein the selection includes an additional indication of error characteristics to display for the network request type, the error characteristics including at least one of error rate and latency.

7. The method of claim 1, wherein the abbreviated URLs are determined by a threshold number of common path segments between URLs of network requests for the respective host.

8. A non-transitory, computer-readable medium comprising instructions that, when executed by a processor, cause the processor to perform stages for providing network insights relative to an application, the stages comprising:
    receiving, on a graphical user interface ("GUI"), a selection of multiple hosts that receive network requests;
    for the selected hosts, retrieving stored network requests and grouping the network requests according to abbreviated uniform resource locators ("URLs") of the network requests;
    displaying, on the GUI, network errors corresponding to the abbreviated URLs; and
    displaying, on the GUI, a visual overlay that compares network errors for the selected hosts, wherein the comparison includes overlapping chart information visually representing the relative network errors of first and second cycles, and wherein the second cycle is a past time period compared to the first cycle.

9. The non-transitory, computer-readable medium of claim 8, wherein the first cycle is represented as multiple bars for respective multiple days and the second cycle is represented as overlays, wherein a past date value is selected on the GUI for the past time period of the second cycle.

10. The non-transitory, computer-readable medium of claim 8, wherein the network errors corresponding to abbreviated URLs is displayed contemporaneously on the GUI with the visual overlay.

11. The non-transitory, computer-readable medium of claim 8, wherein the GUI further displays, for the abbreviated URLs, a number of errors, an error rate, a latency, and a number of network requests to the respective abbreviated URL.

12. The non-transitory, computer-readable medium of claim 8, the stages further comprising:
    receiving a selection of a first abbreviated URL on the GUI; and
    displaying, on the GUI, a network log for the first abbreviated URL.

13. The non-transitory, computer-readable medium of claim 8, wherein the selection includes an additional indication of error characteristics to display for the network request type, the error characteristics including at least one of error rate and latency.

14. The non-transitory, computer-readable medium of claim 8, wherein the abbreviated URLs are determined by a threshold number of common path segments between URLs of network requests for the respective host.

15. A system for providing network insights relative to an application, the system comprising:

a non-transitory, computer-readable medium containing instructions; and
a processor that executes the monitoring module to perform stages comprising:
    receiving, on a graphical user interface ("GUI"), a selection of multiple hosts that receive network requests;
    for the selected hosts, retrieving stored network requests and grouping the network requests according to abbreviated uniform resource locators ("URLs") of the network requests;
    displaying, on the GUI, network errors corresponding to the abbreviated URLs; and
    displaying, on the GUI, a visual overlay that compares network errors for the selected hosts, wherein the comparison includes overlapping chart information visually representing the relative network errors of first and second cycles, and wherein the second cycle is a past time period compared to the first cycle.

16. The system of claim 15, wherein the first cycle is represented as multiple bars for respective multiple days and the second cycle is represented as overlays, wherein a past date value is selected on the GUI for the past time period of the second cycle.

17. The system of claim 15, wherein the network errors corresponding to abbreviated URLs is displayed contemporaneously on the GUI with the visual overlay.

18. The system of claim 15, wherein the GUI further displays, for the abbreviated URLs, a number of errors, an error rate, a latency, and a number of network requests to the respective abbreviated URL.

19. The system of claim 15, wherein the selection includes an additional indication of error characteristics to display for the network request type, the error characteristics including at least one of error rate and latency.

20. The system of claim 15, wherein the abbreviated URLs are determined by a threshold number of common path segments between URLs of network requests for the respective host.

* * * * *